US010915311B2

(12) United States Patent
Zalpuri et al.

(10) Patent No.: US 10,915,311 B2
(45) Date of Patent: *Feb. 9, 2021

(54) AUTOMATED FIRMWARE UPDATE MANAGEMENT ON HUGE BIG-DATA CLUSTERS

(71) Applicant: EMC IP Holding Company LLC, Hopkinton, MA (US)

(72) Inventors: Naveen Zalpuri, Foster City, CA (US); Vishal Jain, Fremont, CA (US); Zehava Vardy, Sunnyvale, CA (US); Srinivasan Ramamoorthy, Fremont, CA (US); Jason Stock, Hopedale, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/402,942

(22) Filed: May 3, 2019

(65) Prior Publication Data
US 2019/0258474 A1   Aug. 22, 2019

Related U.S. Application Data

(63) Continuation of application No. 14/501,474, filed on Sep. 30, 2014, now Pat. No. 10,331,428.

(51) Int. Cl.
*G06F 8/65*  (2018.01)
*G06F 8/654* (2018.01)

(52) U.S. Cl.
CPC ............... *G06F 8/65* (2013.01); *G06F 8/654* (2018.02)

(58) Field of Classification Search
CPC .................................. G06F 8/65; G06F 8/654
(Continued)

(56) References Cited

U.S. PATENT DOCUMENTS

| 7,222,339 B2 * | 5/2007 | Rothman | G06F 8/65 |
| | | | 717/168 |
| 7,490,205 B2 * | 2/2009 | Benhase | G06F 11/2058 |
| | | | 711/162 |

(Continued)

OTHER PUBLICATIONS

Kim et al, "Remote Progressive Firmware Update for Flash-Based Networked Embedded Systems", [Online], 2009, pp. 407-412, [Retrieved from internet on Oct. 30, 2020], <https://dl.acm.org/doi/pdf/10.1145/1594233.1594337> (Year: 2009).*

(Continued)

*Primary Examiner* — Ziaul A Chowdhury
*Assistant Examiner* — Zengpu Wei
(74) *Attorney, Agent, or Firm* — Krishnendu Gupta; Peter Jovanovic

(57) ABSTRACT

A system for updating firmware comprises an interface and a firmware update determiner. The interface is for receiving a firmware update bundle, wherein the firmware update bundle comprises a pre-instruction and one or more firmware updates, and for receiving configuration information describing a network cluster. The firmware update determiner is for determining an indication to update a set of nodes of the cluster based at least in part on the configuration information, wherein the indication includes the pre-instruction(s) and the one or more firmware updates. The interface is further for providing the indication to update the set of nodes of the cluster and receiving a summary from each node of the set of nodes of the cluster.

21 Claims, 7 Drawing Sheets

(58) Field of Classification Search
USPC .......................................................... 717/169
See application file for complete search history.

(56) References Cited

U.S. PATENT DOCUMENTS

| | | | |
|---|---|---|---|
| 8,448,162 B2 | 5/2013 | Ramanathan | |
| 9,015,694 B2* | 4/2015 | Gray | G06F 8/654 |
| | | | 717/170 |
| 9,081,643 B2* | 7/2015 | Wang | G06F 8/65 |
| 9,973,382 B2* | 5/2018 | Padmanabhan | H04L 67/34 |
| 2002/0100036 A1 | 7/2002 | Moshir | |
| 2003/0233648 A1 | 12/2003 | Earl | |
| 2004/0255286 A1 | 12/2004 | Rothman | |
| 2006/0130042 A1 | 6/2006 | Dias | |
| 2006/0203718 A1 | 9/2006 | Benhase | |
| 2008/0163190 A1 | 7/2008 | Shirota | |
| 2009/0144720 A1 | 6/2009 | Roush | |
| 2012/0110150 A1* | 5/2012 | Kosuru | H04L 41/0863 |
| | | | 709/221 |
| 2013/0145358 A1* | 6/2013 | Tsongas | G06F 8/65 |
| | | | 717/173 |
| 2014/0052976 A1* | 2/2014 | Marino | G06F 3/0619 |
| | | | 713/2 |
| 2014/0059532 A1* | 2/2014 | Hotham | G06F 8/65 |
| | | | 717/171 |
| 2014/0089912 A1 | 3/2014 | Wang | |
| 2014/0096129 A1 | 4/2014 | Kimmet | |
| 2014/0123124 A1 | 5/2014 | Gray | |
| 2015/0049632 A1* | 2/2015 | Padmanabhan | H04L 67/34 |
| | | | 370/254 |

OTHER PUBLICATIONS

Katzir et al, "Secure Firmware Updates for Smart Grid Devices", [Online], 2011, pp. 1-5, [Retrieved from internet on Oct. 30, 2020], <https://ieeexplore.ieee.org/stamp/stamp.jsp?tp=&arnumber=6162728> (Year: 2011).*

Kim et al, "Energy-Efficient Progressive Remote Update for Flash-Based Firmware of Networked Embedded Systems", [Online], 2010, pp. 1-26, [Retrieved from internet on Oct. 30, 2020], <https://dl.acm.org/doi/pdf/10.1145/1870109.1870116> (Year: 2010).*

Katzir et al., "Secure Firmware Update for Smart Grid Devices", [Online], 2011, pp. 1-5, [Retrieved from internet on Mar. 29, 2019], < https://ieeexplore.ieee.org/stamp/stamp.jsp?tp=&arnumber=6162728> (Year: 2011).

Kim et al., "Remote Progressive Firmware Update for Flash-Based Networked Embedded Systems", [Online], 2009, pp. 407-412 , [Retrieved from internet on Mar. 29, 2019], <http://delivery.acm.org/10.1145/1600000/1594337/p407-kim.pdf?ip=151.207.250.41&id=1594337&acc=ACTIVE%20SERVICE&key=C15944E53D0ACA63%2E4D> (Year: 2009).

Nilsson et al., "Secure Firmware Updates over the Air in Intelligent Vehicles", [Online], 2008, Pages: , [Retrieved from internet on Mar. 29, 2019], <https://patents.google.com/scholar/14448728935991125354?q=update&q=firmware&q=software&scholar&oq=update+firmware+software&page=14> (Year: 2008).

* cited by examiner

AUTOMATED FIRMWARE UPDATE MANAGEMENT ON HUGE BIG-DATA CLUSTERS

CROSS REFERENCE TO OTHER APPLICATIONS

This application is a continuation of co-pending U.S. patent application Ser. No. 14/501,474, entitled AUTOMATED FIRMWARE UPDATE MANAGEMENT ON HUGE BIG-DATA CLUSTERS filed Sep. 30, 2014 which is incorporated herein by reference for all purposes.

BACKGROUND OF THE TECHNOLOGY

Big data clusters often comprise of hundreds to thousands of machines running applications in concert. While many such clusters are built on commodity hardware, some run on custom appliances for better application performance and manageability. The appliance vendors build these custom appliances from hardware procured from different and/or multiple manufacturers. A big data cluster may comprise up to thousands of such appliances with hardware components from different hardware vendors. Typically, firmware for hardware in a cluster is manually loaded for each piece of hardware. This is very time consuming task when there are hundreds to thousands of machines. Supporting the appliances can be a very complex, tedious, slow and error-prone process.

BRIEF DESCRIPTION OF THE DRAWINGS

Various embodiments of the technology are disclosed in the following detailed description and the accompanying drawings.

DETAILED DESCRIPTION

Figure 1:
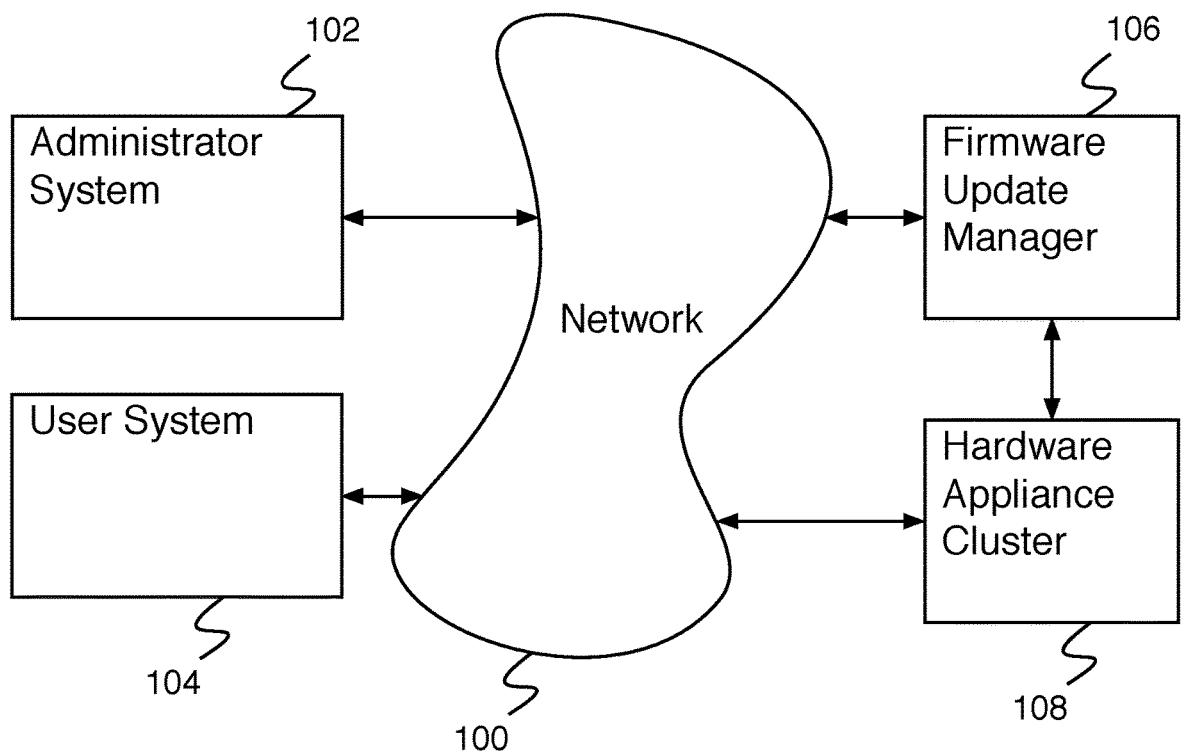
FIG. 1 is a block diagram illustrating an example embodiment of a network system.

The technology can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the technology. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the technology is provided below along with accompanying figures that illustrate the technology. The technology is described in connection with such embodiments, but the technology is not limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of example and the technology may be practiced according to the claims without some or all of these specific details.

A system for updating firmware is disclosed. The system comprises an interface and a firmware update determiner. The interface is for receiving a firmware update bundle, wherein the firmware update bundle comprises a pre-instruction and one or more firmware updates and receiving configuration information describing a network cluster. The firmware update determiner is for determining an indication to update a set of nodes of the cluster based at least in part on the configuration information, wherein the indication includes the pre-instruction(s) and the one or more firmware updates. The interface is further for providing the indication to update the set of nodes of the cluster and receiving a summary from each node of the set of nodes of the cluster.

A system for updating firmware is disclosed. The system for updating firmware comprises a system for updating firmware on each computer of a computer cluster. The computer includes a set of cards each with their own firmware. In some embodiments, the system for updating firmware comprises a firmware update manager. In some embodiments, the computer cluster comprises a computer cluster for processing of large data sets. In various embodiments, the computer cluster comprises 128, 512, 999, 3152, 8192, or any other appropriate number of computers. The system for updating firmware uses a firmware update bundle and cluster configuration information to update firmware on the computers of the computer cluster. The firmware update bundle comprises a bundle of firmware updates (e.g., update for each of the set of cards in a computer), wherein each firmware update as well as the order of the firmware updates has been verified to function correctly (e.g., the update occurs successfully without causing the computer to crash or otherwise malfunction). In some embodiments, the firmware update bundle aggregates duplicated commands for efficiency (e.g., all reboots are put at the end and consolidated to only one reboot). The system selects a subset of the computers of the computer cluster (e.g., a predetermined number of computers at a time—for example, 2, 4, 16, 32, 64, 128, etc.), where the computers in the subset have predetermined degree of logical separation within the cluster (e.g., computers of the cluster are arranged into groups of four; no more than one computer from any group is selected, the logical separation enables the cluster to function without failure in the event that the subset is offline for firmware updating). The subset of computers of the computer cluster is then updated. In various embodiments, the cluster configuration information comprises a list of hosts including one or more of the following: a firmware update manager, a server name, a server grouping, a rack grouping, or any other appropriate information. For example, cluster configuration information is listed in a file:

```
[root@dca11-mdw tmp]# cat /home/gpadmin/gpconfigs/hostfile
mdw
smdw
sdw1
sdw2
sdw3
sdw4
sdw5
sdw6
sdw7
sdw8
sdw9
sdw10
sdw11
sdw12
sdw13
sdw14
sdw15
sdw16
```

In some embodiments, there are a different number of numbered servers (e.g., sdw1-sdw32, sdw1-sdw64, sdw1-sdw128, sdw1-sdw256, sdw1-sdw512, sdw1-sdw1024, sdw1-sdw2048, sdw1-sdw-4096, etc.). In some embodiments, a rack grouping is designated. For example, a rack is listed with servers associated with the rack:

```
[root@dca11-mdw tmp]# cat /home/gpadmin/gpconfigs/hostfile
mdw
smdw
rack1:
    sdw1
    sdw2
    sdw3
    sdw4
rack2:
    sdw5
    sdw6
    sdw7
    sdw8
rack3:
    sdw9
    sdw10
    sdw11
    sdw12
rack4:
    sdw13
    sdw14
    sdw15
    sdw16
```

In some embodiments, a subset of hardware is selected for updating of firmware using a subset selection rule. For example, a server hostname has a prefix number that denotes the server number (e.g., server_number=16 for sdw16) that an operation is performed on (e.g., a modulo operation or other selection type function—for example, in the event that server_number mod 4=0, select the server for the firmware update; and next time the selection selects server_number mod 4=1, then 2, then 3, etc.).

In some embodiments, the subset of computers of the computer cluster is updated by providing the computer with the firmware update bundle, comprising pre information and a set of firmware updates. A pre-instruction comprises information describing preconditions for a firmware update to occur (e.g., system versions, software versions, hardware module check, etc.), operations that need to occur before the firmware update can be performed (e.g., changes to system configuration file(s), etc.), or other information that is relevant prior to the processing of a firmware update. In some embodiments, the firmware update bundle comprises global pre-instruction(s) (e.g., initial instruction(s)) as well as pre-instruction(s) associated with each firmware update of the set of firmware updates. In some embodiments, the firmware update bundle additionally comprises post-instruction(s) (e.g., information describing operations to be performed after the firmware update has taken place, e.g., changes to configuration files, system reboot, etc.). In some embodiments, the firmware update bundle comprises both global post-instruction(s) (e.g., final instruction(s)) as well as post-instruction(s) associated with each firmware update of the set of firmware updates. Each computer of the computer cluster receives and executes the firmware update bundle (e.g., executes initial instruction(s), executes firmware updates including pre-instruction(s) and post-instruction(s), and executes final instruction(s)). In some embodiments, each computer additionally sends summary information to the firmware update manager. In some embodiments, the subset of computers of the computer cluster is updated by the firmware update manager communicating with each computer of the subset of computers (e.g., initial instruction(s) is/are provided by the firmware update manager to a computer of the subset; when confirmation is received that the initial instruction(s) has/have been executed, a first firmware update including pre-instruction(s) and post-instruction(s) are provided by the firmware update manager to the computer, etc.).

FIG. 1 is a block diagram illustrating an example embodiment of a network system. In some embodiments, the network system of FIG. 1 comprises a system for updating firmware. In some embodiments, firmware update manager 106 comprises a system for updating firmware. In the example shown, administrator system 102, user system 104, firmware update manager 106, and hardware appliance cluster 108 communicate with one another via network 100. In various embodiments, network 100 comprises one or more of the following: a local area network, a wide area network, a wired network, a wireless network, the Internet, an intranet, a storage area network, or any other appropriate communication network. In the example shown, firmware update manager 106 communicates directly with hardware appliance cluster 108. In some embodiments, firmware update manager 106 is implemented on a computer comprising part of hardware appliance cluster 108.

In various embodiments, administrator system 102, user system 104, firmware update manager 106, and hardware appliance cluster 108 and subsets thereof are in physical proximity to one another (e.g., in the same building, in the same room, etc.) or are physically remote from one another (e.g., in separate buildings of a campus, in separate locations of a business, at separate offices of a collaboration between organizations, in separate countries, etc.). In various embodiments, the processors comprising administrator system 102, user system 104, firmware update manager 106, and hardware appliance cluster 108 comprise any one of a variety of proprietary or commercially available single or multi-processor systems (e.g., an Intel-based processor) or other type of commercially available processor able to support communications in accordance with each particular embodiment and application. In various embodiments, hardware appliance cluster 108 comprises 4, 32, 193, 1024, 5000, or any other appropriate number of hardware appliances (e.g., computers). User system 104 comprises a system accessed by a user for using networked software (e.g., enterprise software, database software, engineering software, etc.). In some embodiments, user system 104 comprises a system for executing computing jobs on hardware appliance cluster 108. Administrator system 102 comprises a system accessed by an administrator for administrating the network system of FIG. 1. In various embodiments, administrating the network system comprises configuring application software, configuring backup software, administering backup recovery operations, or any other appropriate administrator action. In some embodiments, administrator system 102 comprises a system for maintaining hardware appliance cluster 108. In some embodiments, administrator system 102 comprises a system for upgrading firmware on appliance cluster 108. In some embodiments, administrator system 102 comprises a system for requesting firmware updates on appliance cluster 108. Firmware update manager 106 comprises a system for updating firmware. In some embodiments, firmware update manager 106 comprises a system for updating firmware on appliance cluster 108. In some embodiments, firmware update manager 106 comprises a system for receiving a firmware update bundle and a cluster configuration, determining a firmware update indication, providing the update indication, and receiving update status summaries.

Figure 2:
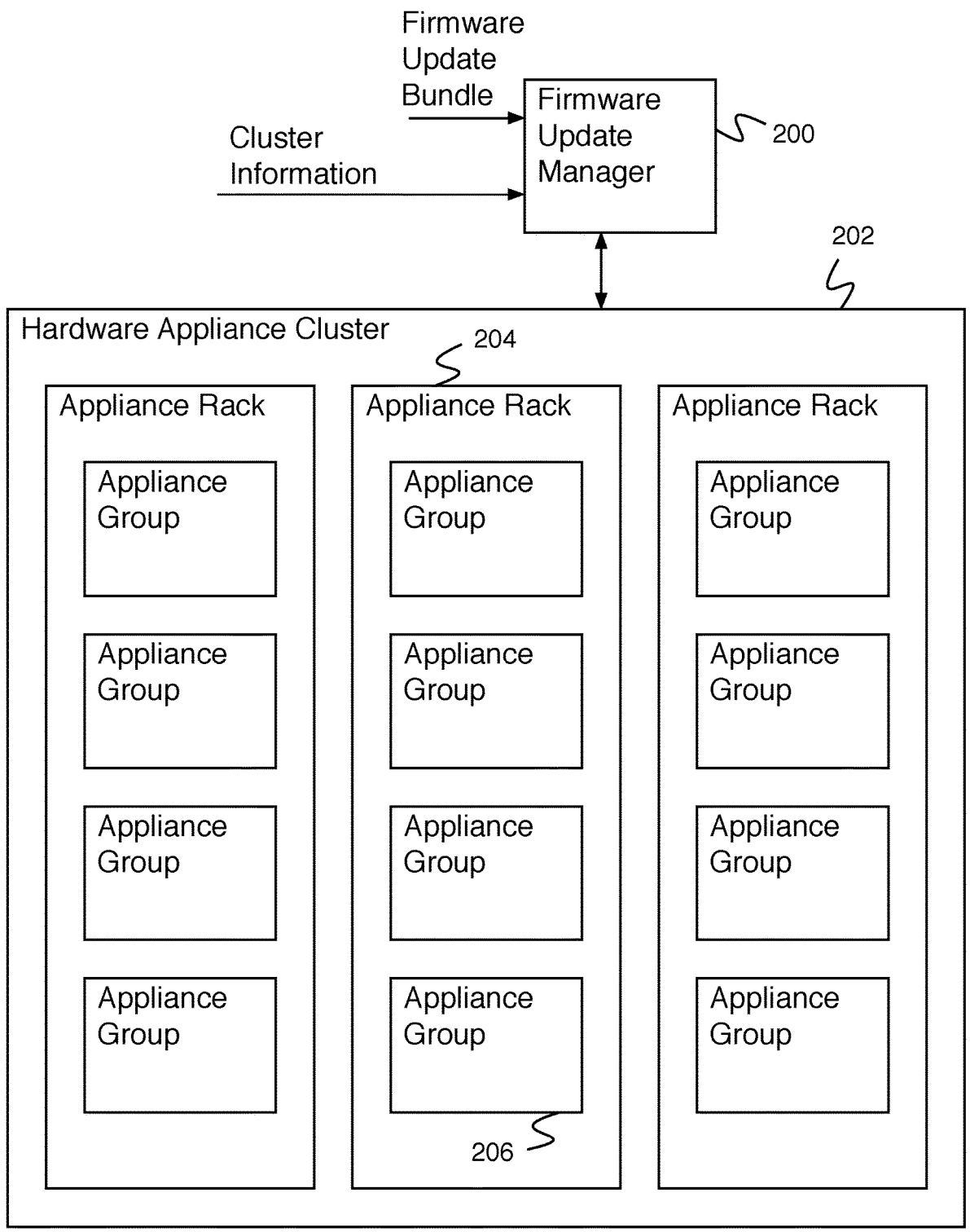
FIG. 2 is a block diagram illustrating an example embodiment of a firmware update manager and a hardware appliance cluster.

FIG. 2 is a block diagram illustrating an example embodiment of a firmware update manager and a hardware appliance cluster. In some embodiments, firmware update manager 200 comprises firmware update manager 106 of FIG. 1. In some embodiments, hardware appliance cluster 202 comprises hardware appliance cluster 108 of FIG. 1. In the example shown, firmware update manager 200 receives cluster information. In some embodiments, firmware update manager 200 receives cluster information from an administrator system via a network. In some embodiments, firmware update manager 200 receives cluster information directly from hardware appliance cluster 202. In some embodiments, firmware update manager 200 stores cluster information after receiving it (e.g., so the same information does not need to be sent multiple times). In various embodiments, cluster information comprises hardware appliance types, hardware appliance software versions, hardware appliance operating system versions, hardware appliance firmware versions, hardware appliance cluster organization information, hardware appliance cluster size information, or any other appropriate hardware appliance cluster information. For example, cluster information is listed in a file:

```
[root@dca11-mdw tmp]# cat /home/gpadmin/gpconfigs/hostfile
mdw
smdw
sdw1
sdw2
sdw3
sdw4
sdw5
sdw6
sdw7
sdw8
sdw9
sdw10
sdw11
sdw12
sdw13
sdw14
sdw15
sdw16
```

In some embodiments, there are a different number of numbered servers (e.g., sdw1-sdw32, sdw1-sdw64, sdw1-sdw128, sdw1-sdw256, sdw1-sdw512, sdw1-sdw1024, sdw1-sdw2048, sdw1-sdw-4096, etc.). In some embodiments, a rack grouping is designated.

Firmware update manager 200 additionally receives a firmware update bundle. In some embodiments, firmware update manager 200 receives a firmware update bundle from an administrator system via a network. In some embodiments, a firmware update bundle comprises a set of firmware updates. In some embodiments, the firmware update bundle comprises pre-instruction(s) for determining whether a firmware update should be applied and assisting with the successful application of the firmware update. In some embodiments, the firmware update bundle comprises post-instruction(s) for returning a hardware appliance to a correct state after application of a firmware update. In some embodiments the firmware update bundle comprises initial instruction(s) (e.g., instruction(s) to be executed before any firmware updates are executed). In some embodiments, the firmware update bundle comprises final instruction(s) (e.g., instruction(s) to be executed after all firmware updates are executed). Hardware appliance cluster 202 comprises a set of hardware appliances. In the example shown, hardware appliances are arranged into appliance groups (e.g., appliance group 206). In various embodiments, appliance groups comprise 2, 4, 8, 11, or any other appropriate number of hardware appliances. In some embodiments, all appliance groups comprise the same number of hardware appliances. In some embodiments, different appliance groups comprise different numbers of hardware appliances. In the example shown, appliance groups are arranged into appliance racks (e.g., appliance rack 204). In the example shown, each appliance rack comprises 4 appliance groups. In various embodiments, appliance racks comprise 4, 5, 9, 22, or any other appropriate number of appliance groups. In some embodiments, all appliance racks comprise the same number of appliance groups. In some embodiments, different appliance racks comprise different numbers of appliance groups.

Figure 3:
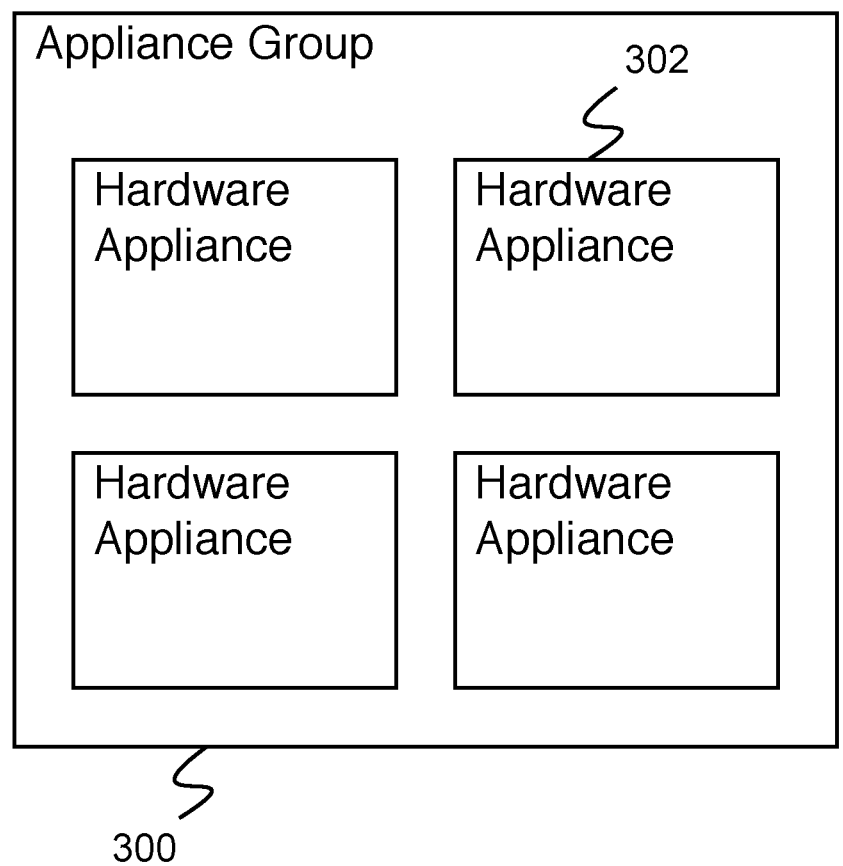
FIG. 3 is a block diagram illustrating an example embodiment of an appliance group.

FIG. 3 is a block diagram illustrating an example embodiment of an appliance group. In some embodiments, appliance group 300 comprises appliance group 206 of FIG. 2. In the example shown, appliance group 300 comprises 4 hardware appliances (e.g., hardware appliance 302). In some embodiments, hardware appliances comprise installed hardware modules (e.g., cards). In some embodiments, hardware modules require periodic firmware updating. In various embodiments, a module in an appliance comprises one or more of the following: a server BIOS (Basic Input/Output System), a server BMC (baseboard management controller), a RAID (redundant array of independent disks) controller, or any other appropriate module.

Figure 4:
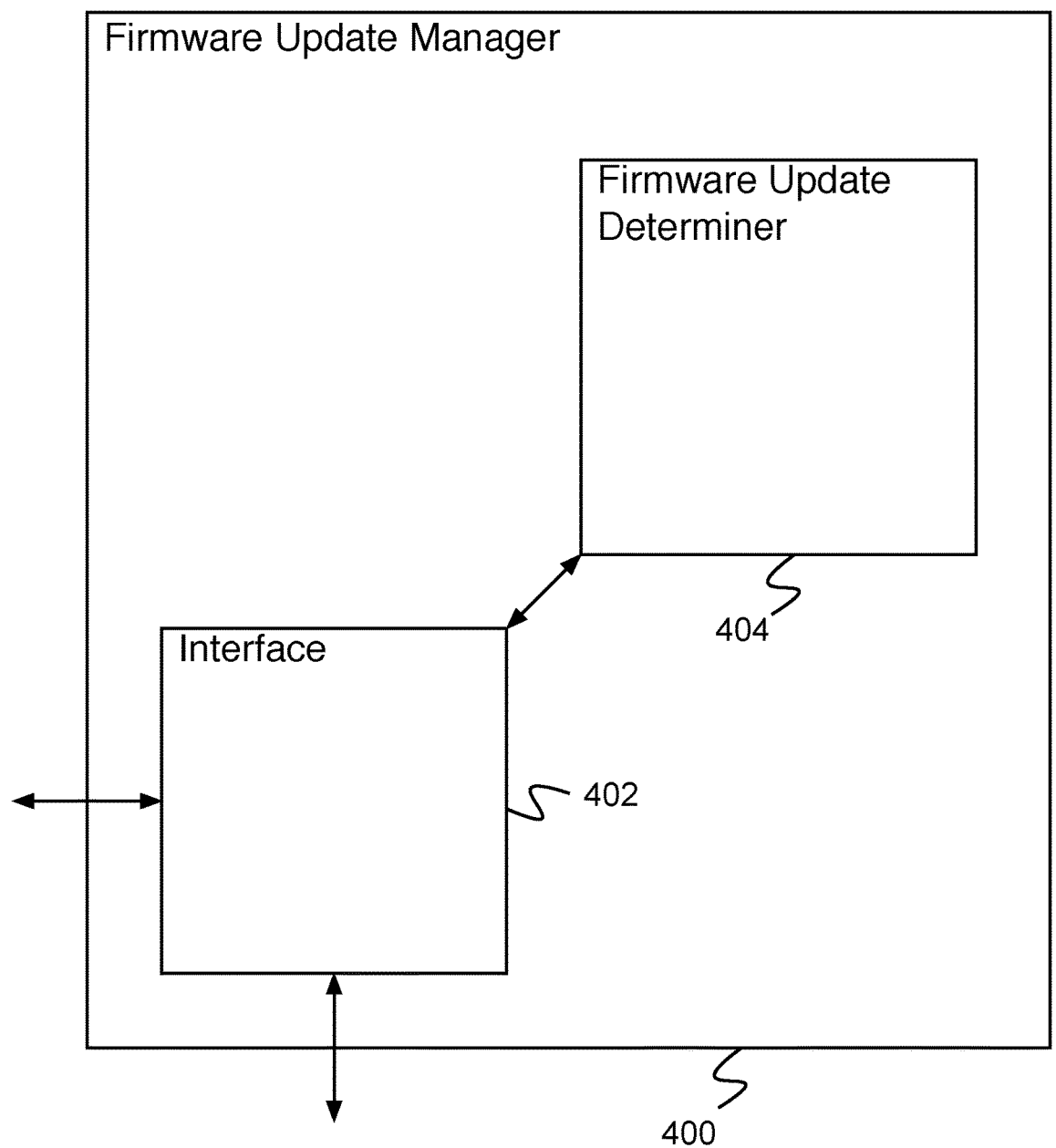
FIG. 4 is a block diagram illustrating an example embodiment of a firmware update manager.

FIG. 4 is a block diagram illustrating an example embodiment of a firmware update manager. In some embodiments, firmware update manager 400 of FIG. 4 comprises firmware update manager 200 of FIG. 2. In the example shown, firmware update manager 400 comprises interface 402 and firmware update determiner 404. In some embodiments, interface 400 comprises an interface for communicating with a network (e.g., network 100 of FIG. 1). In some embodiments, interface 400 comprises an interface for communicating with a hardware appliance cluster (e.g., hardware appliance cluster 202 of FIG. 2). In some embodiments, interface 402 comprises a processor. Firmware update determiner 404 comprises a firmware update determiner for determining a firmware update. In some embodiments, firmware update determiner 404 comprises a processor. In some embodiments, firmware update determiner 404 determines a firmware update for a hardware appliance cluster. In some embodiments, firmware update determiner 404 determines a firmware update based at least in part on a firmware update bundle and on cluster information. In some embodiments, firmware update determiner 404 determines a set of hardware appliances of a hardware appliance cluster to receive a firmware update. In some embodiments, firmware update determiner 404 determines to send a firmware update bundle to a set of hardware appliances of the hardware appliance cluster. In some embodiments, firmware update determiner 404 indicates firmware update actions (e.g., executing initial instruction(s), executing pre-instruction(s), executing firmware updates, executing post-instruction(s), executing final instruction(s), etc.) to a set of hardware appliances of a hardware appliance cluster as indicated by a firmware update bundle. In some embodiments, firmware update determiner 404 and interface 402 comprise the same processor. In some embodiments, firmware update determiner 404 and interface 402 comprise different processors.

Figure 5:
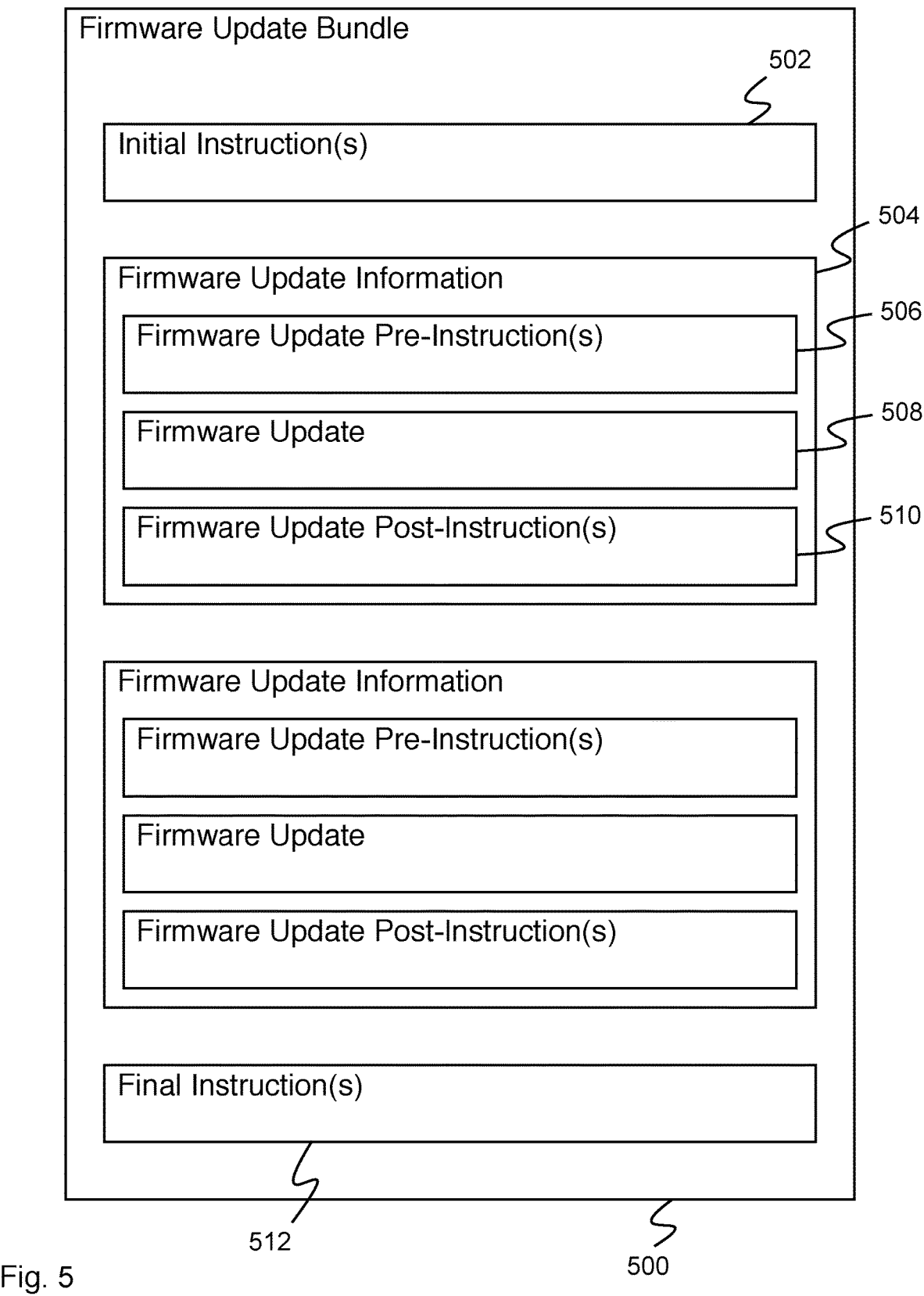
FIG. 5 is a block diagram illustrating an example embodiment of a firmware update bundle.

FIG. 5 is a block diagram illustrating an example embodiment of a firmware update bundle. In some embodiments, firmware update bundle 500 is received by a firmware update manager (e.g., firmware update manager 200 of FIG. 2). In some embodiments, firmware update bundle 500 is provided by an administrator system to the firmware update manager. In the example shown, firmware update bundle 500 comprises initial instruction(s) 502, one or more sets of firmware update information (e.g., firmware update information 504 or firmware update information following 504 and prior to final instruction(s) 512), and final instruction(s) 512. In various embodiments, a firmware bundle includes one or more of the following: firmware binaries, configuration files, license files, instruction files, or any other appropriate files. For example, a firmware bundle comprises:

```
[dcddev@dcddev 2A00]$ tar -tvf dca_firmware_2A00.tgz
drwx------ root/root         0 2014-08-13 10:52:58 firmware_bin/
-rwx------ root/root      1179 2014-08-13 10:52:58 firmware_bin/flashupdt.cfg
drwx------ root/root         0 2014-08-13 10:52:58 firmware_bin/Licenses/
-rwx------ root/root      4205 2014-08-13 10:52:58 firmware_bin/Licenses/license.txt
drwx------ root/root         0 2014-08-13 10:52:58 firmware_bin/Licenses/Others/
-rwx------ root/root       916 2014-08-13 10:52:58 firmware_bin/Licenses/Others/MD5_Message-Digest-License.txt
-rwx------ root/root      3092 2014-08-13 10:52:58 firmware_bin/Licenses/Others/SSL-Implementation-License.txt
-rwx------ root/root     36685 2014-08-13 10:52:58 firmware_bin/Licenses/Others/NetBeansLicense.txt
-rwx------ root/root      1506 2014-08-13 10:52:58 firmware_bin/Licenses/Others/AES-License.txt
-rwx------ root/root     27136 2014-08-13 10:52:58 firmware_bin/Licenses/INTEL-SOFTWARE-LICENSE-AGREEMENT-WITH.doc
drwx------ root/root         0 2014-08-13 10:52:58 firmware_bin/Licenses/EFIToolKit/
-rwx------ root/root      1564 2014-08-13 10:52:58 firmware_bin/Licenses/EFIToolKit/BSD-License-From-Intel.txt
-rwx------ root/root     33879 2014-08-13 10:52:58 firmware_bin/master.cfg
drwx------ root/root         0 2014-08-13 10:52:58 firmware_bin/BIOS Recovery Files/
-rwx------ root/root   5441040 2014-08-13 10:52:58 firmware_bin/BIOS Recovery Files/R02.03.0003Rec.cap
-rwx------ root/root    246400 2014-08-13 10:52:58 firmware_bin/BIOS Recovery Files/ipmi.efi
-rwx------ root/root   8918016 2014-08-13 10:52:58 firmware_bin/BIOS Recovery Files/iFlash32.efi
-rwx------ root/root      1759 2014-08-13 10:52:58 firmware_bin/BIOS Recovery Files/startup.nsh
-rwx------ root/root   2883584 2014-08-13 10:52:58 firmware_bin/BIOS Recovery Files/rml.rom
-rwx------ root/root      1567 2014-08-13 10:52:58 firmware_bin/BIOS Recovery Files/BIOS Recovery Procedure.txt
-rwx------ root/root  16778602 2014-08-13 10:52:58 firmware_bin/BMC_i_0121r6038.bin
-rwx------ root/root      4920 2014-08-13 10:52:58 firmware_bin/S2600GL.fru
-rwx------ root/root        59 2014-08-13 10:52:58 firmware_bin/BMC_i_0121r6038.MD5
-rwx------ root/root      1179 2014-08-13 10:52:58 firmware_bin/flashupdt_da.cfg
-rwx------ root/root      1645 2014-08-13 10:52:58 firmware_bin/ME.nsh
-rwx------ root/root   2231952 2014-08-13 10:52:58 firmware_bin/MEComplete_02.01.07.328.cap
-rwx------ root/root      4919 2014-08-13 10:52:58 firmware_bin/S2600GZ.fru
-rwx------ root/root      4060 2014-08-13 10:52:58 firmware_bin/Startup.nsh
-rwx------ root/root   9307136 2014-08-13 10:52:58 firmware_bin/fwpiaupd.efi
-rwx------ root/root   5178896 2014-08-13 10:52:58 firmware_bin/R02.03.0003.cap
-rwx------ root/root    246400 2014-08-13 10:52:58 firmware_bin/ipmi.efi
-rwx------ root/root        53 2014-08-13 10:52:58 firmware_bin/FRUSDR.nsh
-rwx------ root/root    624027 2014-08-13 10:52:58 firmware_bin/S2600GZ.sdr
-rwx------ root/root   8919552 2014-08-13 10:52:58 firmware_bin/frusdr.efi
-rwx------ root/root   8918016 2014-08-13 10:52:58 firmware_bin/iFlash32.efi
-rwx------ root/root     11906 2014-08-13 10:52:58 firmware_bin/BMC-MIB.mib
-rwx------ root/root   5178896 2014-08-13 10:52:58 firmware_bin/R02.03.0003.cap.old
-rwx------ root/root       259 2014-08-13 10:52:58 firmware_bin/BMC.nsh
-rwx------ root/root      1759 2014-08-13 10:52:58 firmware_bin/BIOS.nsh
-r-x------ root/root     32264 2014-08-13 10:52:58 dca_firmware_update_driver.py
-r-------- root/root      1413 2014-08-13 10:52:58 firmwareupdate.xml
-rw------- root/root     16984 2014-08-13 15:25:49 MegaSAS.log
-rw------- root/root   8912896 2014-08-13 10:52:58 MR59p3.rom
```

In some embodiments, a file in the bundle comprises a driver program (e.g., dca_firmware_update_driver.py). In some embodiments, a file in the bundle comprises an instruction file (e.g., firmwareupdate.xml). In some embodiments, an example of instructions is as follows:

```
<docroot>
    <execute type="firmwareUpdate" devicetype="host">
        <name>RAID Firmware update 23.12.0-0013</name>
        <version>23.12.0-0013</version>
        <vendor>Intel</vendor>
        <component>RAID</component>
        <command>/opt/MegaRAID/CmdTool2/CmdTool2</command>
        <bin>MR59p3.rom</bin>
        <params>-adpfwflash -f MR59p3.rom -aall</params>
        <timeout>240</timeout>
        <appliesto>allhosts</appliesto>
        <queryscript>none</queryscript>
        <needsreboot>no</needsreboot>
    </execute>
    <execute type="postUpdate" devicetype="host">
        <name>post BIOS update syscfg change</name>
        <version>02.03.0003</version>
        <vendor>Intel</vendor>
        <component>BIOS</component>
        <command>/opt/dca/sbin/syscfg</command>
        <bin>firmwareupdate.xml</bin>
        <params>/bldfs emcbios</params>
        <timeout>120</timeout>
        <appliesto>allhosts</appliesto>
        <queryscript>none</queryscript>
        <needsreboot>yes</needsreboot>
    </execute>
</docroot>
```

In some embodiments, a firmware update bundle is executed by executing initial instruction(s), executing the one or more sets of firmware update information in the order indicated, and executing the final instruction(s). In some embodiments, firmware update bundle 500 comprises a verified firmware update bundle (e.g., the firmware update bundle has been verified to correctly update firmware on a hardware appliance and leave the hardware appliance in a functional state). In some embodiments, a firmware update leaves a hardware appliance in a state that is not functional (e.g., in the event that the update did not meet conditions for installation or was not properly integrated into the system after the installation or if the environment such as the operating system version is not compatible with the firmware update), and the memory with the newly loaded firmware must be removed and/or reloaded. In some embodiments, the firmware update bundle is verified by a system administrator accessing an administrator system. In some embodiments, the firmware update bundle is verified by a firmware update bundle verifier. In some embodiments, the firmware update bundle comprises multiple firmware updates. In various embodiments, the firmware update bundle comprises all firmware updates for a piece of hardware (e.g., for a piece of hardware that is part of a hardware appliance), all firmware updates for all appropriate pieces of hardware, firmware updates published during a predetermined period of time, or any other appropriate firmware updates. In the example shown, each set of firmware update information comprises firmware update pre-instruction(s) (e.g., firmware update pre-instruction(s) 506), a firmware update (e.g., firmware update 508), and firmware update post-instruction(s) (e.g., firmware update post-instruction(s) 510). In some embodiments, executing a set of firmware update information comprises executing the firmware update pre-instruction(s), executing the firmware update, and executing the firmware update post-instruction(s). In some embodiments, firmware update pre-instruction(s) comprise checks to determine whether a firmware update should be executed (e.g., checking a system version, checking a firmware version, etc.). In some embodiments, firmware update pre-instruction(s) comprise system changes that should be made before a firmware update is executed (e.g., system changes, configuration changes, etc.). In some embodiments, firmware update post-instruction(s) comprise reboot instruction(s). In some embodiments, firmware update post instruction(s) comprise system changes that should be made after a firmware update is executed. In some embodiments, initial instruction(s) 502 comprise common pre-instruction(s) (e.g., pre instruction(s) required by more than one firmware update). In some embodiments, pre-instruction(s) that are included in initial instruction(s) 502 are removed from firmware update pre-instruction(s) (e.g., so that they can be executed only once, prior to all firmware updates) for more efficient running of the system. In some embodiments, final instruction(s) 512 comprise common post-instruction(s) (e.g., post instruction(s) required by more than one firmware update). In some embodiments, post-instruction(s) that are included in final instruction(s) 512 are removed from firmware update post-instruction(s) (e.g., so that they can be executed only once, after all firmware updates such as only one system reboot for all the firmware updates instead of multiple time consuming reboots) for more efficient running of the system.

In some embodiments, the update bundle includes firmware updates for all possible modules in appliances (e.g., all possible cards in appliances). Part of the pre-instruction(s) is/are a test to determine whether the firmware update is required for the appliance (e.g., whether the module or card is present). In the event that the firmware is not required, the update is not loaded or run. In the event that the firmware is required, the update is loaded or run.

In various embodiments, there are no initial instructions, there are not final instructions, there are no pre-instructions, there are no post-instructions, there is one initial instruction, there is one final instruction, there is one pre-instruction, there is one post-instruction, there are multiple initial instructions, there are multiple final instructions, there are multiple pre-instructions, there are multiple post-instructions, or any appropriate combination of instruction(s) or lack of instructions.

Figure 6:
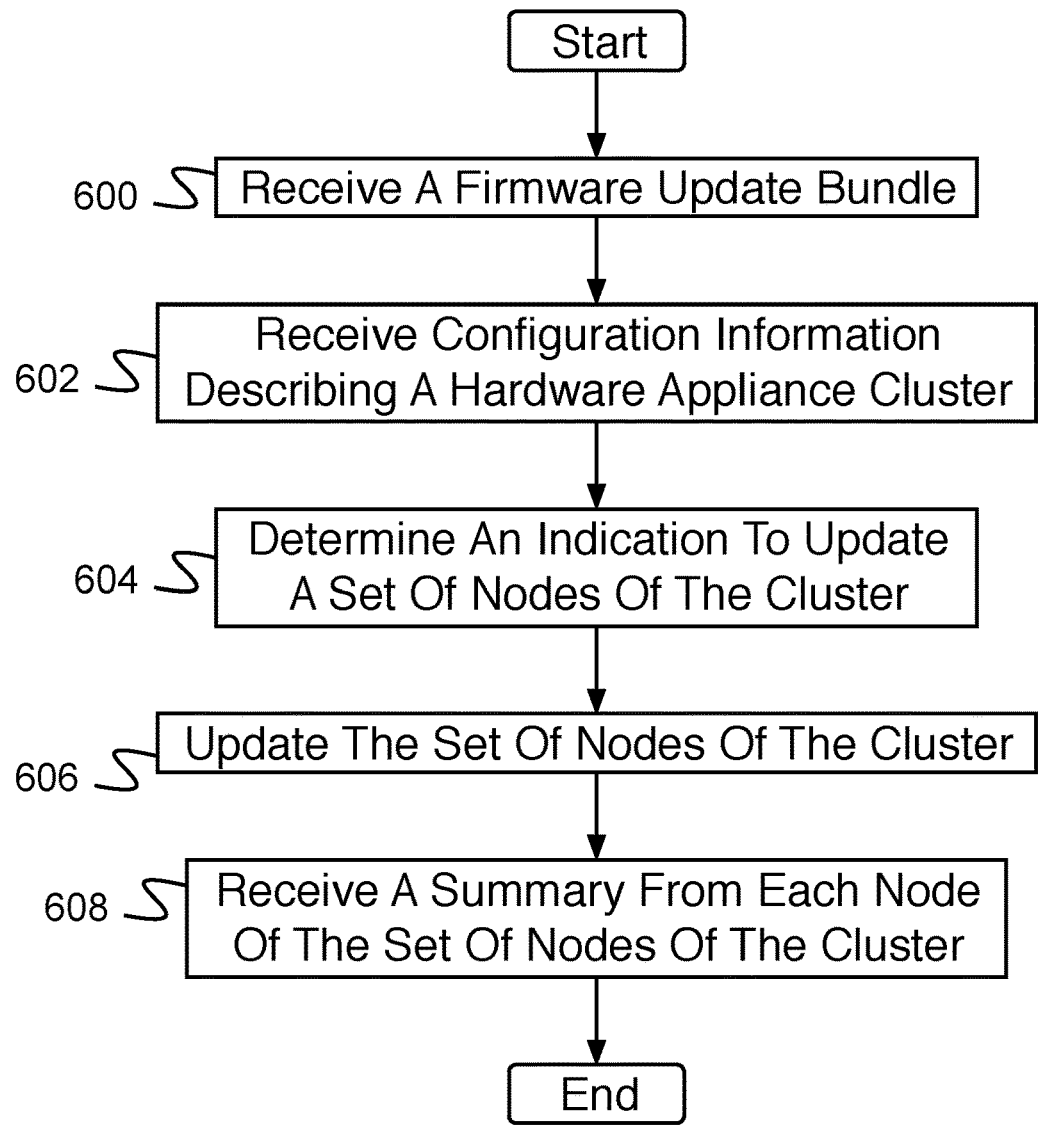
FIG. 6 is a flow diagram illustrating an example embodiment of a process for updating firmware.

FIG. 6 is a flow diagram illustrating an example embodiment of a process for updating firmware. In some embodiments, the process of FIG. 6 is executed by firmware update manager 400 of FIG. 4. In the example shown, in operation 600, a firmware update bundle is received. In various embodiments, the firmware update bundle comprises initial instruction(s), final instruction(s), firmware update information, pre-instruction(s), post-instruction(s), firmware updates, or any other appropriate information. In operation 602, configuration information describing a hardware appliance cluster is received. In various embodiments, configuration information comprises rack information (e.g., hardware rack configuration, hardware rack type, number of hardware racks, etc.), group information (e.g., hardware group configuration, hardware group type, number of hardware groups, number of hardware groups per rack, etc.), appliance information (e.g., hardware appliance configuration, hardware appliance type, number of hardware appliances, number of hardware appliances per group, etc.), hardware module information (number of hardware modules installed on a hardware appliance, type of hardware modules installed on a hardware appliance, version of hardware modules installed on a hardware appliance, card information, etc.), or any other appropriate cluster information. In some embodiments, the configuration information comprises stored configuration information. In some embodiments, the configuration information comprises configuration information received in the past.

An operation 604 is executed to determine an indication to update a set of nodes of the cluster is determined. In some embodiments, a node comprises a hardware appliance (e.g., hardware appliance 302 of FIG. 3). In some embodiments, determining an indication to update a set of nodes of the cluster comprises determining the set of nodes of the cluster. In some embodiments, the process of FIG. 6 comprises a process for updating firmware on the set of nodes of the cluster (e.g., a subset of all of the nodes of the cluster). In some embodiments, the process of FIG. 6 is executed repeatedly on different sets of nodes of the cluster until all nodes of the cluster are updated. In some embodiments, determining an indication to update a set of nodes of the cluster comprises including a firmware update bundle. In operation 606, the set of nodes of the cluster is updated. In some embodiments, updating the set of nodes of the cluster comprises providing the firmware update bundle to each of the set of nodes of the cluster. In some embodiments, updating the set of nodes of the cluster comprises providing each of the set of nodes of the cluster with commands to execute firmware update information (e.g., initial instruction(s), pre-instruction(s), firmware updates, post-instruction(s), final instruction(s), etc.). In operation 608, a summary is received from each node of the set of nodes of the cluster. In various embodiments, the summary comprises log information, system status information, system configuration information, firmware update success information, or any other appropriate information. In some embodiments, summaries received in 608 comprise a set of summaries. In some embodiments, the set of summaries is compiled into a single cluster summary. In some embodiments, the set of summaries is made public (e.g., for retrieval by an administrator system). In some embodiments, the set of summaries is provided to an administrator system.

In some embodiments, an example of a summary of firmware updating is:

```
++++++++++++++++++++++++++++++++++++++++++++++++++++++++++
SUMMARY
++++++++++++++++++++++++++++++++++++++++++++++++++++++++++
The firmware update took 1985.99409604 seconds to complete
Check logfile: /var/log/dca_firmware_update.log for further details
----------------------------------------------------------
>>>>>>>>HOST:sdw1<<<<<<<<
The component RAID Firmware update 23.22.0-0020 : Skipped Update,
already on updated version, Success
The component BIOS Firmware update 02.03.0003 : Successful
The server sdw1 was rebooted after the update
The syscfg changes were applied on server sdw1 and reboot was
triggered following that
----------------------------------------------------------
>>>>>>>>HOST:sdw2<<<<<<<<
The component RAID Firmware update 23.22.0-0020 : Skipped Update,
already on updated version, Success
The component BIOS Firmware update 02.03.0003 : Successful
The server sdw2 was rebooted after the update
The syscfg changes were applied on server sdw2 and reboot was
triggered following that
----------------------------------------------------------
>>>>>>>>HOST:sdw3<<<<<<<<
The component RAID Firmware update 23.22.0-0020 : Skipped Update,
already on updated version, Success
The component BIOS Firmware update 02.03.0003 : Successful
The server sdw3 was rebooted after the update
```

-continued

```
The syscfg changes were applied on server sdw3 and reboot was
triggered following that
----------------------------------------------------------
>>>>>>>>HOST:sdw4<<<<<<<<
The component RAID Firmware update 23.22.0-0020 : Skipped Update,
already on updated version, Success
The component BIOS Firmware update 02.03.0003 : Successful
The server sdw4 was rebooted after the update
The syscfg changes were applied on server sdw4 and reboot was
``` triggered following that

This summary may be formatted as character delimited flat file, an XML formatted file, or other suitably formatted file.

Figure 7:
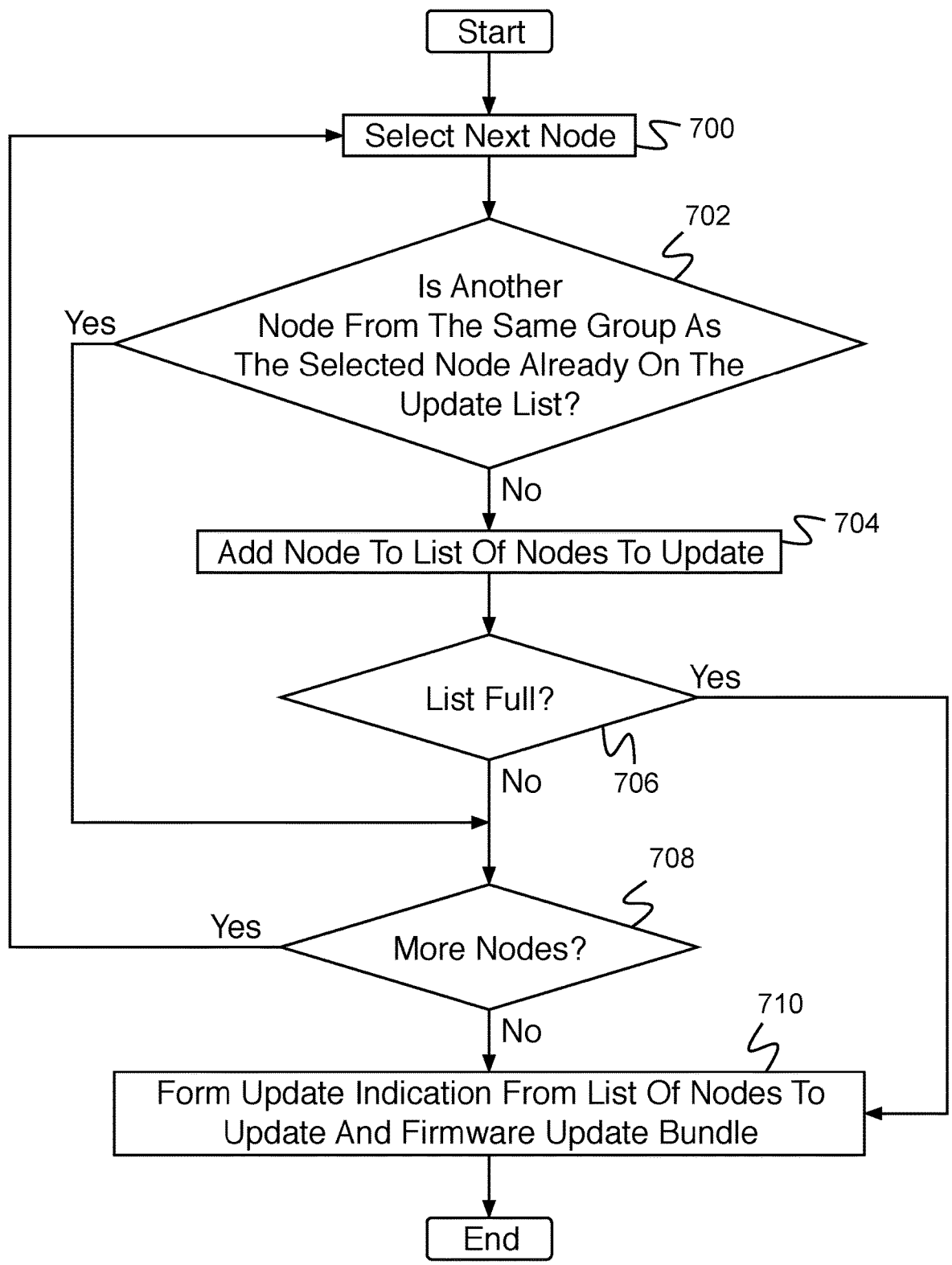
FIG. 7 is a flow diagram illustrating an example embodiment of a process for determining an indication to update a set of nodes of a cluster.

FIG. 7 is a flow diagram illustrating an example embodiment of a process for determining an indication to update a set of nodes of a cluster. In some embodiments, the process of FIG. 7 implements operation 604 of FIG. 6. In some embodiments, the cluster comprises hardware appliance cluster 202 of FIG. 2. In the example shown, in operation 700 the next node (e.g., the next node of the cluster) is selected. In some embodiments, the next node comprises the first node. In some embodiments, the next node is selected from the nodes in the cluster that have not been updated with the updates in the firmware update bundle. A decisional operation 702 is executed to determine whether another node from the same group (e.g., a group as in appliance group 300 of FIG. 3) is already on the update list. In some embodiments, only one node of a group is added to the update list. In various embodiments, a different constraint is used (e.g., no more than two nodes of a group are added to the update list, only one node of a rack is added to the update list, no more than five nodes of a rack are added to the update list, etc.). In some embodiments, determining whether another node is from the same group enables determining that each node is not in a same group as any other node in the set of nodes (e.g., each node is in a different group as any other node in the set of nodes). In the event it is determined that another node from the same group as the selected node is already on the update list, control passes to 708. In the event it is determined that no other node from the same group as the selected node is already on the update list, control passes to 704. In operation 704, the node is added to the list of nodes to update. A decisional operation 706 is executed to determine whether the list is full. In various embodiments, the list is full when it comprises 8 nodes, 15 nodes, 32 nodes, 87 nodes, or any other appropriate number of nodes. In some embodiments, determining whether the list is full comprises determining whether the set of nodes has a number of appropriate nodes In the event it is determined that the list is full, control passes to 710. In the event it is determined that the list is not full, control passes to 708. In operation 708, it is determined whether there are more nodes (e.g., more nodes in the cluster). In the event it is determined that there are more nodes in the cluster, control passes to 700. In the event it is determined that there are not more nodes in the cluster, control passes to 710. In operation 710, an update indication is formed from the list of nodes to update and a firmware update bundle. For example, each node in the list of nodes is provided with an update bundle and an instruction to execute as appropriate the elements in the bundle. This enables each node to appropriately run portions of the bundle based on its own configuration. This enables the firmware updater to select appropriate subsets of the cluster to provide the bundle to with the understanding of the configuration of the cluster so that the cluster can continue to operate. Or, for example, each node is provided the instruction(s) to execute that are appropriate from the bundle. This enables each node to only receive appropriate instruction(s) and firmware updates that are appropriate reducing transmission to nodes, but requiring the firmware updater to determine appropriate instruction(s) to transfer to each node. In some embodiments, an example of updating instructions comprises:

```
<execute type="firmwareUpdate" devicetype="host">
    <name>RAID Firmware update 23.12.0-0013</name>
    <version>23.12.0-0013</version>
    <vendor>Intel</vendor>
    <component>RAID</component>
    <command>/opt/MegaRAID/CmdTool2/CmdTool2</command>
    <bin>MR59p3.rom</bin>
    <params>-adpfwflash -f MR59p3.rom -aall</params>
    <timeout>240</timeout>
    <appliesto>allhosts</appliesto>
    <queryscript>getservertype.sh</queryscript>
    <needsreboot>no</needsreboot>
</execute>
``` where, a script (e.g., getservertype) identifies whether the target server is a candidate for a firmware update or not.

Although the foregoing embodiments have been described in some detail for purposes of clarity of understanding, the technology is not limited to the details provided. There are many alternative ways of implementing the technology. The disclosed embodiments are illustrative and not restrictive.

What is claimed is:

1. A method for updating firmware, comprising:
   receiving, by one or more processors via an interface, a firmware update bundle, wherein the firmware update bundle comprises an initial instruction and one or more sets of firmware update pre-instructions and firmware updates, and the firmware update pre-instructions comprises checks to determine whether the firmware update in the one or more sets should be executed; and
   providing, by one or more processors, an update indication to a subset of one or more nodes on an update list, wherein:
      the subset of one or more nodes is determined based at least in part on a determination that each of the subset of one or more nodes are from a different appliance group of a network cluster;
      the subset comprises a plurality of nodes, and the subset is further determined based at least in part on a predetermined degree of logical separation between two of the plurality of nodes;
      the predetermined degree of logical separation corresponds to a criteria that at least two of the plurality of nodes are selected to be from different racks of hardware;
      the determination that each of the subset of one or more nodes are from the different appliance group is based at least in part on configuration information pertaining to the network cluster;
      nodes of the network cluster that are not within the subset of one or more nodes on the update list are not contemporaneously updated with a firmware update included in the firmware update bundle in connection with the update indication; and
      the network cluster comprises a plurality of nodes.

2. A system for updating firmware, comprising:
   one or more processors configured to:
      receive, via an interface, a firmware update bundle, wherein the firmware update bundle comprises an initial instruction and one or more sets of firmware update pre-instructions and firmware updates, and the firmware update pre-instructions comprises checks to determine whether the firmware update in the one or more sets should be executed; and
      provide an update indication to a subset of one or more nodes on an update list, wherein:
         the subset of one or more nodes is determined based at least in part on a determination that each of the subset of one or more nodes are from a different appliance group of a network cluster;
         the subset comprises a plurality of nodes, and the subset is further determined based at least in part on a predetermined degree of logical separation between two of the plurality of nodes;
         the predetermined degree of logical separation corresponds to a criteria that at least two of the plurality of nodes are selected to be from different racks of hardware;
         the determination that each of the subset of one or more nodes are from the different appliance group is based at least in part on configuration information pertaining to the network cluster;
         nodes of the network cluster that are not within the subset of one or more nodes on the update list are not contemporaneously updated with a firmware update included in the firmware update bundle in connection with the update indication; and
         the network cluster comprises a plurality of nodes; and
   a memory coupled to the one or more processors and configured to provide the one or more processors with instructions.

3. The system of claim 2, wherein the checks are based on one of the following: system configuration, module configuration, or firmware version number.

4. The system of claim 2, wherein the firmware updates comprised in the firmware update are bundled in a manner that aggregates one or more commands that would be duplicated if the firmware updates were individually applied.

5. The system of claim 2, wherein the appliance group comprise one or more hardware appliances.

6. The system of claim 2, wherein the one or more processors are configured to:
   select a node from among the plurality of nodes comprised in the network cluster; and
   determine whether the node is from a same group as any one or more nodes in the subset of one or more nodes from the network cluster that are on the update list.

7. The system of claim 6, wherein the one or more processors are configured to receive the configuration information, the configuration information describes the network cluster, and a determination of whether the node is from the same group as any one or more nodes in the subset of one or more nodes from the network cluster that are on the update list is based at least in part on configuration information describing the network cluster.

8. The system of claim 7, wherein the configuration information comprises one or more of the following: a previously stored configuration information, a hardware rack configuration information, a hardware group configuration information, a node configuration information, or a hardware module configuration information.

9. The system of claim 6, wherein in response to a determination that the node is not from the same group as any one or more nodes in the subset of one or more nodes on the update list, is added to the update list.

10. The system of claim 2, wherein the one or more processors are configured to determine an update indication for one or more nodes on the update list, and the update indication includes the firmware update bundle.

11. The system of claim 2, wherein the firmware bundle is provided to the subset of the one or more nodes on an update list in connection with the update indication.

12. The system of claim 2, wherein instructions that are included in the initial instruction and the firmware update pre-instructions are removed from the firmware update pre-instructions and executed only once with the initial instructions.

13. The system of claim 2, wherein the firmware update bundle further comprises post-instructions and a final instruction.

14. The system of claim 13, wherein a post-instruction of the post instructions comprises a configuration change.

15. The system of claim 13, wherein the final instruction comprises a reboot instruction.

16. The system of claim 15, wherein the firmware update bundle comprises only one reboot instruction.

17. The system of claim 2, wherein at least two nodes in the subset of the one or more nodes on the update list have a predetermined degree of logical separation within the network cluster.

18. The system of claim 2, wherein the one or more processors receive a summary from one or more nodes on the update list, wherein the summary comprises a status associated with execution of the pre-instruction and the firmware update.

19. The system of claim 2, wherein each node in the subset of one or more nodes on the update list is in a different group as any other node in a set of nodes.

20. The system of claim 2, wherein after the update indication is provided to the subset of the one or more nodes on the update list, the update list is iteratively updated based on a set of nodes from the network cluster to be updated.

21. A computer program product for updating firmware, the computer program product being embodied in a non-transitory computer readable storage medium and comprising computer instructions for:
  receiving, by one or more processors via an interface, a firmware update bundle, wherein the firmware update bundle comprises an initial instruction and one or more sets of firmware update pre-instructions and firmware updates, and the firmware update pre-instructions comprises checks to determine whether the firmware update in the one or more sets should be executed; and
  providing, by one or more processors, an update indication to a subset of one or more nodes on an update list, wherein:
    the subset of one or more nodes is determined based at least in part on a determination that each of the subset of one or more nodes are from a different appliance group of a network cluster;
    the subset comprises a plurality of nodes, and the subset is further determined based at least in part on a predetermined degree of logical separation between two of the plurality of nodes;
    the predetermined degree of logical separation corresponds to a criteria that at least two of the plurality of nodes are selected to be from different racks of hardware;
    the determination that each of the subset of one or more nodes are from the different appliance group is based at least in part on configuration information pertaining to the network cluster;
    nodes of the network cluster that are not within the subset of one or more nodes on the update list are not contemporaneously updated with a firmware update included in the firmware update bundle in connection with the update indication; and
    the network cluster comprises a plurality of nodes.

* * * * *